US005866181A

United States Patent [19]

Hill

[11] Patent Number: 5,866,181

[45] Date of Patent: Feb. 2, 1999

[54] LABEL ASSEMBLY FOR WRAPPING VEGETABLES

[75] Inventor: Walt Hill, Visalia, Calif.

[73] Assignee: Moore Business Forms, Inc., Grand Island, N.Y.

[21] Appl. No.: 797,733

[22] Filed: Feb. 11, 1997

Related U.S. Application Data

[62] Division of Ser. No. 537,367, Sep. 29, 1995, Pat. No. 5,645,300.

[51] Int. Cl.[6] .............................. A21D 10/02; B65D 85/00

[52] U.S. Cl. .......................... 426/107; 426/113; 426/124; 426/125; 426/383; 426/396; 206/459.5; 206/232

[58] Field of Search ..................................... 426/107, 113, 426/124, 125, 234, 106, 383, 87, 396; 206/459.5, 232

[56] References Cited

U.S. PATENT DOCUMENTS

| | | | |
|---|---|---|---|
| Re. 32,739 | 8/1988 | Terauds | 220/306 |
| 3,245,338 | 4/1966 | Korr | 426/107 |
| 3,271,169 | 9/1966 | Baker et al. | 426/107 |
| 4,452,356 | 6/1984 | Dahl | 206/45.32 |
| 4,570,818 | 2/1986 | Borst et al. | 220/339 |
| 4,574,174 | 3/1986 | McGonigle | 219/10.55 M |
| 4,576,330 | 3/1986 | Schepp | 229/44 R |
| 4,873,814 | 10/1989 | Harris | 53/442 |
| 4,973,502 | 11/1990 | Holzmuller et al. | 428/35.8 |
| 5,046,659 | 9/1991 | Warburton | 229/2.5 |
| 5,161,687 | 11/1992 | Kornell et al. | 206/447 |
| 5,342,093 | 8/1994 | Weernink | 285/81 |
| 5,352,465 | 10/1994 | Gondek et al. | 426/87 |
| 5,387,781 | 2/1995 | Berkoff | 219/735 |
| 5,607,709 | 3/1997 | Fritz et al. | 426/106 |
| 5,645,300 | 7/1997 | Hill | 283/81 |
| 5,691,437 | 11/1997 | Main | 428/42.1 |

*Primary Examiner*—Nina Bhat
*Attorney, Agent, or Firm*—Nixon & Vanderhye, P.C.

[57] ABSTRACT

A label assembly is provided allowing the aesthetic packaging of vegetables, other food items, or other products, for point of purchase display in a simple, versatile and effective manner. First and second flexible strips of material (e.g. paper or plastic) have a header formed at one end and are overlapped at the other end to be held together by adhesive. An adhesive pattern of discrete spaced adhesive elements is provided on the inner face of at least one of the strips and engages the container or covering of a product being packaged so that the label assembly does not inadvertently detach from the package. The label assembly is particularly suited for use with a microwavable tray having an open top covered by plastic shrink wrap and containing vegetables (there being no adhesive where the label covers the open top), or for encircling a number of low density polypropylene bags (e.g. containing vegetables) which are held together by the label assembly.

20 Claims, 5 Drawing Sheets

LABEL ASSEMBLY FOR WRAPPING VEGETABLES

This is a divisional of application Ser. No. 08/537,367, filed Sep. 29, 1995, now U.S. Pat. No. 5,645,300.

BACKGROUND AND SUMMARY OF THE INVENTION

There are many circumstances in which label assemblies are desirable for packaging products. A common problem with label assemblies, however, when used for packaging products (such as food items like vegetables) is that the label may slip from the packaging, or tear plastic portions of the packaging when the label is removed making the packaging less effective for the consumer's purposes. Also depending upon the type of packaging utilized there may be insufficient ability to provide effective graphics or indicia on the label assembly so that it performs an effective point of purchase function.

For example, in one prior art application in which four low density polypropylene bags containing baby carrots were desirably packaged together, the bags were wrapped with a polypropylene non-adhesive band attached to the bag with a printed paper label. The band was wrapped around the bags and attached to itself with a second paper label. This system was undesirable, however, due to difficulties in attaching the band tightly, the inability to provide appealing (aesthetic) graphics, the inability of the paper face stock to withstand moisture as ice melted (typically used during transport of the bagged carrots), and because the polypropylene bag at the top of the packages in a carton would break on impact with ice used to package the carrots. Broken packages resulting from the above-mentioned problems would typically be discarded at the supermarket, creating excessive charge-backs.

According to the present invention a label assembly, and various package arrangements utilizing the label assembly, are provided which overcome the above-mentioned problems and fulfill the need for a label assembly that can effectively properly package for point of purchase sale a wide variety of products, particularly food items which are wrapped in plastic for one reason or another. A label assembly according to the present invention provides an excellent point of purchase function, with readily imaginable graphics and/or indicia, will positively position the label in association with the package yet not destroy underlying plastic elements of the package that are desirably kept intact, and where necessary the label assembly may provide an actual structural function in the packaging.

According to one aspect of the present invention a label assembly is provided comprising the elements: A first flexible strip of material having first and second opposite faces and first and second ends, and a first length between the first and second ends. A second flexible strip of material having first and second opposite faces and first and second ends, and a second length between the first and second ends different from the first length. A first permanent adhesive pattern substantially permanently connecting the first and second strips together adjacent the first end thereof to form a header. A second adhesive pattern disposed on the second strip second face and comprising a plurality of individual adhesive elements spaced from each other on the second strip second face. The first strip second face having adhesive release material in face-to-face engagement with the second adhesive pattern. A third pattern of permanent adhesive spaced from the second pattern and disposed on the second face of one of the first and second strips and adjacent the second end of one of the first and second strips, and in face-to-face engagement with adhesive release material on one of the first and second strips. And, indicia or graphics imaged on the first face of at least one of the first and second strips, including on the header.

In one embodiment of the invention the third pattern may be provided on the second strip second face, with the second length less than the first length, and the third adhesive pattern in face-to-face engagement with release material on the first strip second face. This embodiment is particularly suitable for the wrapping of a plurality of plastic wrapped packages (e.g. low density polypropylene bags containing products such as vegetables). When used for this purpose it is desirable that the second adhesive pattern have sufficient aggressiveness to prevent the label assembly from slipping off the plastic wrapped packages, but insufficient aggressiveness to significantly tear (that is to the point of making the torn plastic bags less usable as an actual package for the vegetables or the like) when the label assembly is detached from the plastic wrapped packages. Also it is desirable to provide the header having an exterior configuration at the first ends of the strips distinct from a dual right-angle configuration, and simulating a perceived element of the product intended to be wrapped by the label assembly (e.g. the green tops of carrots, the shape of a broccoli flower, etc.).

Typically the second adhesive pattern comprises a plurality of spaced (along the length) strips of hot melt adhesive. While it is normally necessary to provide the second adhesive pattern on only one of the second faces (that is of the second strip), a second adhesive pattern may also be provided on the first strip second face and intermesh with the strips on the second strip second face, with adhesive release material provided between the spaced strips. Labels of this configuration are available commercially from Moore Business Forms, Inc. of Lake Forest, Ill. under the trademark "DUOFACE"®, are substantially as illustrated in U.S. Pat. Nos. 3,312,005 and 5,336,541 (the disclosures of which are hereby incorporated by reference herein). The spaced adhesive strips forming the second pattern (whether applied to one or both of the strip second faces) may be applied utilizing conventional presses, such as the Kobel press.

Preferably the graphics or indicia are imaged (e.g. printed or otherwise applied) on the first face of both of the first and second strips. The graphics or indicia include bar coding and indicia indicating the name of the product intended to be wrapped by the label assembly, and under circumstances where the product is food (particularly prepared food) nutritional information.

The label assembly may have the third pattern on the first strip second face, with the first length greater than the second length, and the first strip may be folded over remote from the second pattern so that the third pattern comes into contact with adhesive release material on the first strip second face. This embodiment is particularly suitable for use in wrapping a microwavable tray containing vegetables or other food items that may readily be cooked by microwaving.

The invention also relates to packages packaged by the label assembly according to the present invention, and modifications thereof. For example according to another aspect of the present invention a point of purchase display package is provided comprising the following components: A microwavable material container having a substantially closed bottom and substantially closed sides, and a top. And, a display label wrapped around the container, the label comprising: first and second flexible strips of material having an outer printable face, and first and second ends; a first permanent adhesive pattern connecting the first and second strips together adjacent the first ends thereof to form a header, the header adjacent the top of the container; indicia or graphics imaged on at least part of the outer printable face of at least one of the strips, including said header; the second ends overlapping each other to define an overlap at a portion of the container remote from the header; and a second permanent adhesive pattern connecting the strips together at the overlap.

Preferably the container has a substantially open top and there is transparent plastic wrap (e.g. conventional plastic shrink wrap) covering at least the open top of the container (and optionally wrapped around the entire container) and disposed between the container and the display label. Typically microwave-cookable food (such as vegetables) is disposed within the container, and when that is the case the indicia preferably includes nutritional information.

The imaged indicia or graphics also preferably includes bar coding, which is typically spaced from, but adjacent, the header, for ease of scanning. Also a third adhesive pattern preferably is provided connecting the second strip to the plastic wrap or container bottom or sides, the first strip overlying the plastic wrap covering the substantially open top of the container, and the first strip where overlying the substantially open top being devoid of adhesive connection to the plastic wrap. The third adhesive pattern preferably comprises a plurality of individual adhesive elements spaced from each other, such as spaced strips as shown for one of the individual label elements in the U.S. Pat. Nos. 3,312,005 or 5,336,541.

According to another aspect of the present invention a point of purchase display package is provided comprising the following components: A microwavable material container having a substantially closed bottom and substantially closed sides, and an open top. Transparent plastic wrap covering at least the substantially open top of the container. And, a display label wrapped around the container, the plastic wrap between the container open top and the display label; the label comprising: at least one flexible strip of material having an outer imagable face, and first and second ends; indicia or graphics imaged on at least part of the outer imagable face of the strip; the ends overlapping each other to define an overlap; a first permanent adhesive pattern connecting the ends together at the overlap; and a second adhesive pattern comprising a plurality of spaced discrete adhesive elements disposed on the inner face and engaging the container or the plastic wrap at positions remote from the substantially open top. Microwave-cookable food, such as vegetables, preferably is provided as described above with respect to the previous embodiment, as well as bar coding, the third adhesive pattern, and the like as described above.

According to another aspect of the present invention a package assembly is provided comprising the following elements: A plurality of transparent plastic wrapped packages (e.g. each plastic wrapped package comprising low density polypropylene bags, e.g. containing vegetables or other products). A label assembly encircling the plastic wrapped packages and holding the plastic wrapped packages together. And, the label assembly comprising: first and second strips of material each having first and second ends, and inner and outer opposite faces; a header formed at the first ends of the strips; graphics or indicia imaged on the outer face of at least one of the strips at the header; the second ends overlapping each other to define an overlap at a portion remote from the header; and a first permanent adhesive pattern connecting the strips together at the overlap; and a second adhesive pattern comprising a plurality of spaced adhesive elements disposed on the inner face of at least one of the strips and in contact with the plastic of at least one of the plastic wrapped plastics, said second adhesive pattern having insufficient aggressiveness to tear the plastic when the label assembly is detached from the plurality of plastic wrapped packages, but sufficient aggressiveness to prevent the label assembly from slipping off the plastic wrapped packages.

It is the primary object of the present invention to provide a label assembly, and display packages or package assemblies utilizing the label assembly, providing appropriate label information with good point of purchase capabilities, and which preferably will not readily detach from packages with which it is utilized nor unnecessarily destroy plastic wrap associated with such packages. This and other objects of the invention will become clear from an inspection of the detailed description of the invention and from the appended claims.

DETAILED DESCRIPTION OF THE DRAWINGS

Figure 1:
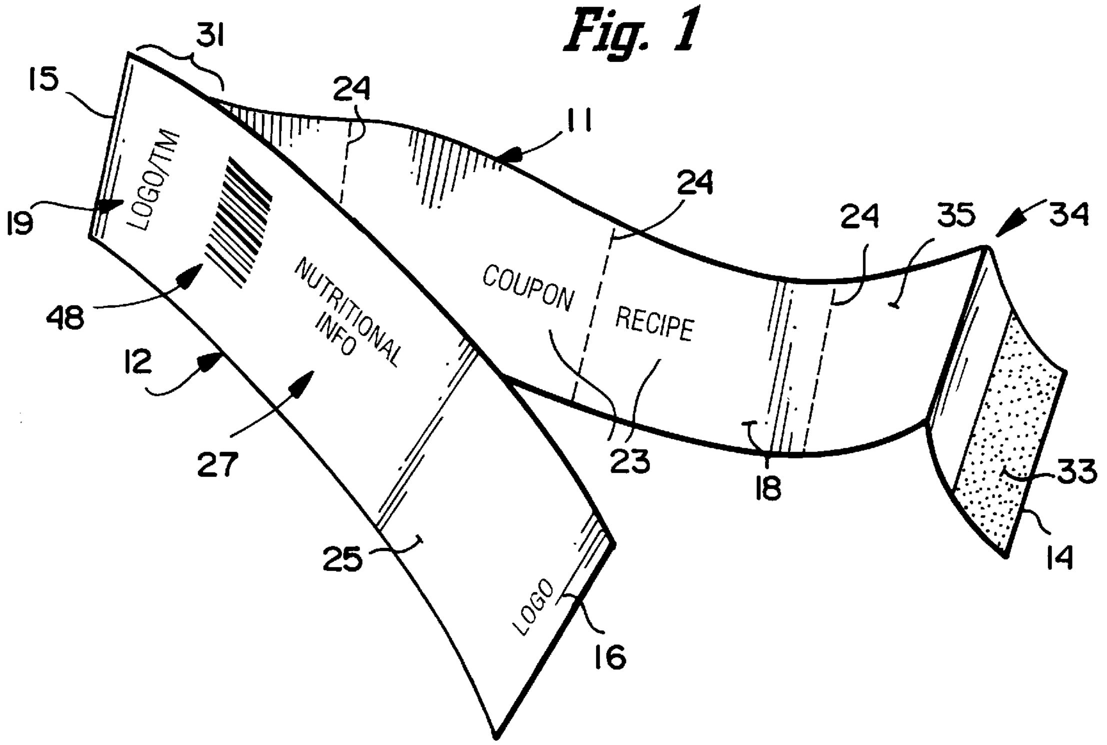
FIG. 1 is a perspective view of one embodiment of an exemplary label assembly according to the present invention.
Figure 2:
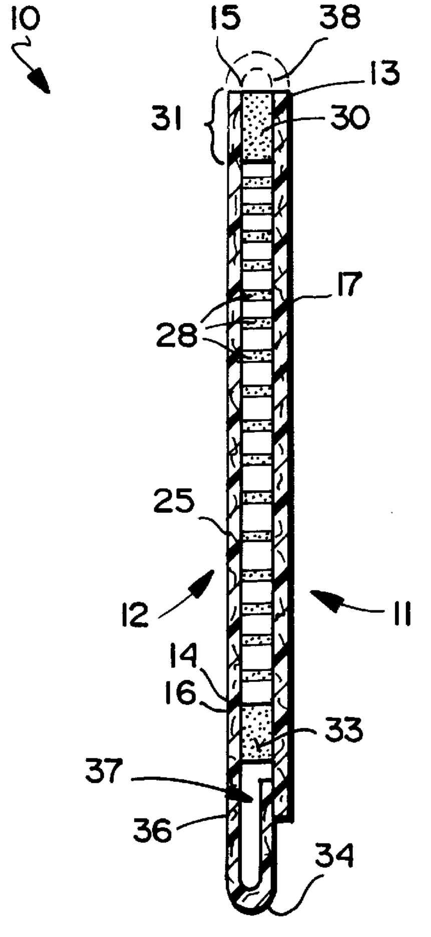
FIG. 2 is a side cross-sectional view of the label assembly of FIG. 1 showing the elements thereof greatly exaggerated in thickness for clarity of illustration.
Figure 4:
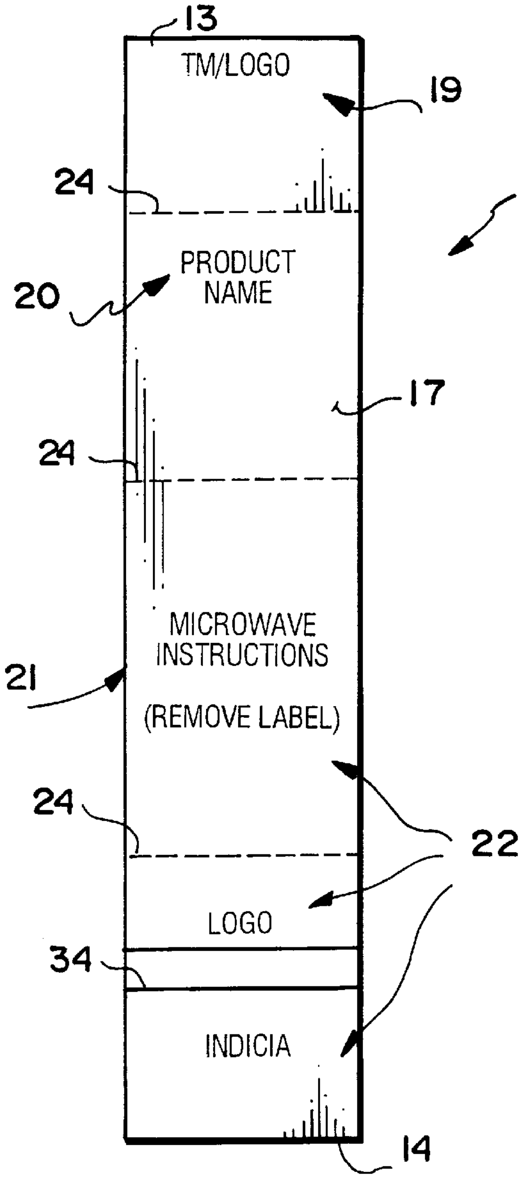
FIG. 4 is a top plan view of the first strip of the assembly of FIG. 1.
Figure 5:
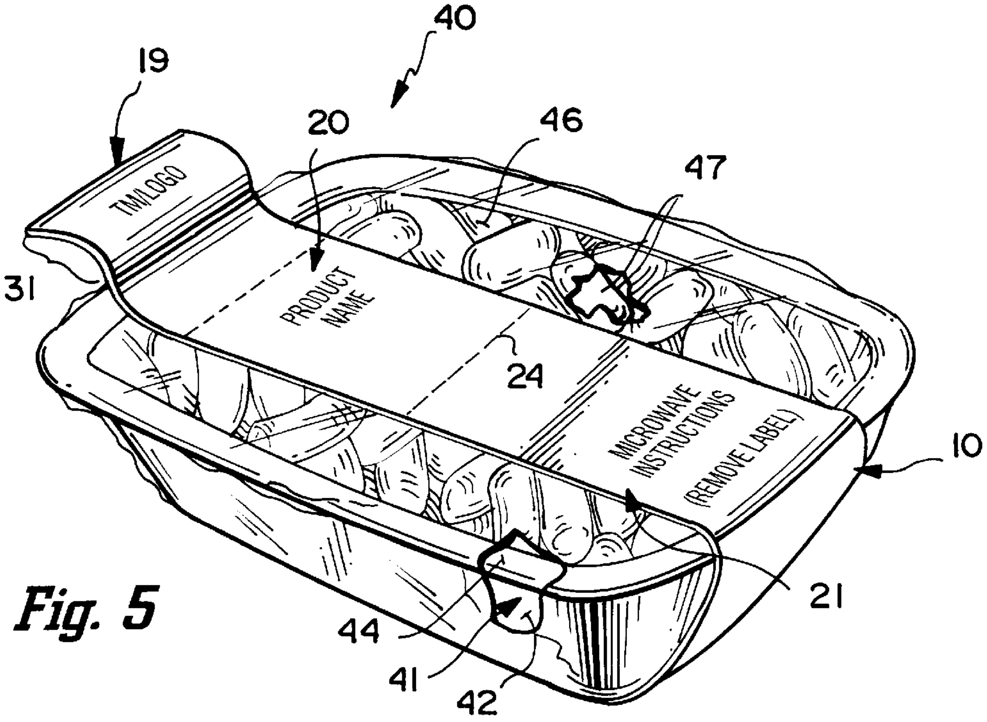
FIG. 5 is a top plan view of one embodiment of a display package according to the present invention which includes the label assembly of FIGS. 1 through 4.
Figure 6:
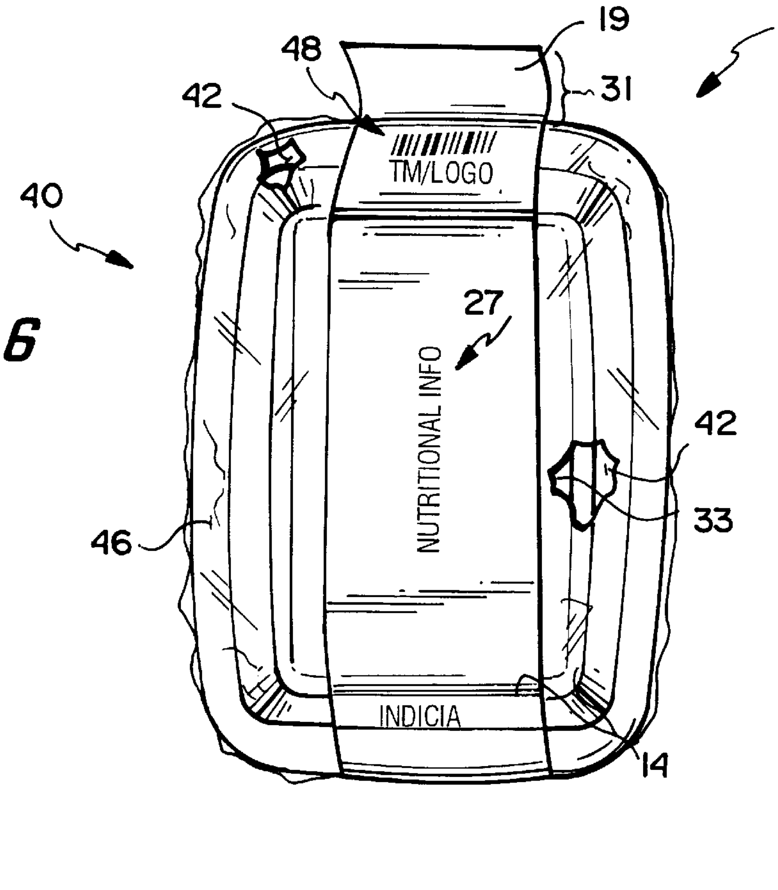
FIG. 6 is a bottom plan view of the display package of FIG. 5.

One embodiment of an exemplary label assembly according to the present invention is shown generally by reference numeral 10 in FIGS. 1 and 2. The label assembly 10 includes a first flexible strip 11 and a second flexible strip 12. The first strip 11 has a first end 13 and a second end 14 with a length (the distance between the ends 13, 14 when the flexible strip 11 is laid out), while the second strip 12 has a first end 15 and a second end 16 with a second length (in this embodiment different than the first length) between the ends 15, 16 when the flexible 12 is laid out. The first strip 11 has an outer face 17 (see FIGS. 2 and 4) and an inner face 18 (see FIG. 1). The outer face 17 must be readily imaginable, for example must accept printing such as from a conventional impact press, ink jet printer, from various electrostatic printing equipment, etc. Graphics and/or indicia are typically imaged on the face 17, for example for the particular strip 11 when used as illustrated in FIGS. 5 and 6 a trademark and/or logo indicia or graphics 19 (see FIG. 4), product name indicia or graphics 20, cooking (e.g. microwave cooking) information indicia 21, and various other instructional, aesthetic, or like indicia 22.

The second face 18 of the first strip 11 also may be imaginable, and may include coupon and/or recipe indicia schematically illustrated at 23 in FIG. 1 (indicia 23 may alternatively be provided on face 17); however the characteristics of at least a portion of the face 18 are that it will not stick to adhesive as will hereinafter be described. Lines of weakness, such as perforations 24, which allow ready detachment of the portions of the strip 11 containing the indicia 23, if desired, may be provided.

In one embodiment according to the invention after the indicia 23 has been imaged on the strip 11 it may be coated with a silicone adhesive release coating for the face 18, or a like adhesive release coating; or indicia 23 may be imaged with an ink jet (which is capable of imaging over adhesive release material); or the strip 11 may be made of suitable material so that it is imagable yet does not readily adhere to adhesive, such as conventional commercially available fiber/plastic blend of web or strip material such as sold under the trademark "Tyvek". The material may also be polypropylene material such as available under the trademark KIMDURA (available from Oji Paper of Japan), or under some circumstances paper or coated paper. For many applications it is desirable that the material readily withstand temperatures between about 32°–90° F., and not degrade significantly if in contact with ice or water.

The second strip 12 also has a first (outer) face 25 (see FIG. 1) and a second (inner) face 26. The first face 25 also is readily imagable, or example having nutritional information indicia 27 and trademark or logo graphics or indicia 19 imaged thereon, while the second face 26 preferably has a pattern of adhesive. The pattern of adhesive on the face 26 preferably is a plurality of individual adhesive elements spaced from each other along the second strip 12 second face 26. In the embodiment actually illustrated in FIG. 3 this is provided by a plurality of thin strips of adhesive 28 spaced from each other along the length (between the ends 15, 16) of the strip 12, such as conventional hot melt adhesive applied by a Kobel press, e. g. in the manner generally described with respect to aforesaid U.S. Pat. Nos. 5,336,541 and 3,312,005. In actuality, the face 18 of the strip 11 need have adhesive release properties only where it will be engaged by the strips 28 during shipment of the label assembly 10 to the end user (that is in the configuration such as schematically illustrated in FIG. 2), and adhesive release material may thus also be applied in strips (again see U.S. Pat. No. 5,336,541).

Figure 3:
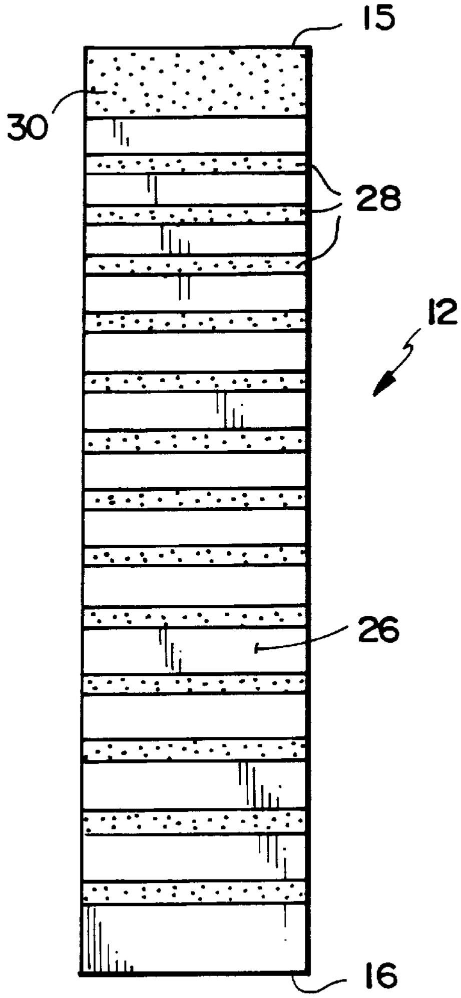
FIG. 3 is a bottom plan view of the second strip of the label assembly of FIG. 1.

The strips 11, 12 preferably are affixed together adjacent the first ends 13, 15 thereof with a permanent adhesive pattern, illustrated at 30 in FIGS. 2 and 3, to define a header 31 (e. g. about 0.75–1.5 inches long, e. g. about 1.25 inches long). The adhesive 30 preferably is applied as a full coating or block to parts of both faces 26,18 and permanently bonds the strips 11,12 together so that they cannot be separated at the header 31. The header 31 will—when so constructed—stand out from the product packaged with the label assembly 10 (see FIG. 5) resulting in a highly desirable point of purchase display. The adhesive 30 preferably is a conventional permanent hot melt adhesive.

For the label assembly 10 there preferably also is provided another adhesive pattern, such as in the form of an adhesive block 33 seen in FIGS. 1 and 2. The adhesive block 33 (again of conventional hot melt adhesive) is disposed adjacent the second end 14 of the first 11. Note that the first strip 11 is significantly longer than the second strip 12, and when the label assembly 10 is being transported before use is typically folded—as at fold line 34 (FIGS. 1, 2, and 4)—so that the adhesive 33 comes in contact with a portion 35 of the face 18, which portion 35 has adhesive release material (e.g. a silicone coating) so that the adhesive 33 will not permanently stick to it. Note that in FIGS. 1, 2, and 4 the first strip 11 is shown as constructed from two discrete strips, the second discrete strip—illustrated generally by reference numeral 36 in FIG. 2—being permanently affixed (by a permanent adhesive or any other suitable structure, including mechanical fasteners, fusing, ultrasonic welding, or the like) at a portion 37 to the main part of the strip 11. Alternatively the strip 11 may be integral throughout.

Note also that although the label assembly 10 is described above as being composed of two distinct strips 11, 12, in view of the fact that the strips will be permanently adhered together by the adhesive 30 to form a header 31 (when provided), in fact the strips 11, 12 may be integral with the ends 14, 16 the opposite ends thereof, as illustrated schematically by the doffed line integral connector 38 in FIG. 2. Construction is normally simpler, however, especially in view of the pattern of adhesive 28 that needs to be applied, if the strips 11, 12 are not integral.

FIGS. 5 and 6 illustrate a use of the label assembly 10 in a point of purchase display package. The display package is shown generally by reference numeral 40 in FIGS. 5 and 6, and in addition to the label assembly 10 includes a microwavable material (e.g. plastic) container 41. The container 41 has substantially closed sides (e.g. the four sides illustrated in FIGS. 5 and 6, and all indicated by reference numeral 42), a substantially closed bottom 43 (see FIG. 6), and a substantially open top, defined by the rim 44 (see FIG. 5). The sides 42 and the bottom 43 may be completely solid plastic, or under some circumstances may be porous or perforated, or the like. While the top defined by rim 44 may be closed with a hinged or other piece of substantially solid plastic, it is preferred that it be open and covered with transparent plastic wrapping 46, such as conventional shrink wrap plastic. In FIGS. 5 and 6 the shrink wrap plastic 46 is shown wrapping the entire container 41 (the top, bottom and sides), although under some circumstances it can wrap only the top to enclose the open top (e.g. be formed around the rim or lip 44 only).

The typical products that will be packaged by the container 41 (although a wide variety of products may be utilized) comprises food items, particularly cookable food items, more particularly microwavable food items, such as vegetables. For example in FIG. 5 carrots (of course almost any other vegetable is suitable) 47 are illustrated disposed within the container 41.

Preferably the label assembly 10 is disposed with respect to the container 41 as illustrated in FIGS. 5 and 6. That is the first strip 11 from adjacent the center toward and near the fold line 34 covers the open top, and since in the preferred embodiment there is no adhesive on the second face 18 at that portion the shrink wrap plastic 46 will not be engaged by adhesive where it covers the open top of the container 41. Therefore the plastic 46 covering the open top will not be harmed when the label assembly 10 is detached. However the second strip 12 second face 26, which engages typically one of the side walls 42 and at least part of the bottom 43, will either engage the container 41 directly or the plastic wrap 46 covering a side wall 42 or the bottom 43 aligned with the second strip 12, in which case the adhesive strips 28 will hold the label assembly 10 in place. Since the strips 28 are widely placed they may be readily removed from either the container 41 portions that they engage and/or the plastic wrap 46, not harming or sticking to the container 41, and probably not tearing the plastic 46; but even if the plastic 46 is partially torn it will not affect the part of the plastic wrap 46 covering the open top of the container 41. Note that it is desirable to detach the label assembly 10 before actually inserting the container 41 into the microwave since the microwave may cause the hot melt adhesive (30, 33, and/or 28) to melt.

The label assembly 10 is also properly affixed encircling the container 41 by the adhesive strip 33 which engages the outer face 25 of the second strip 12 adjacent the second end 16 thereof, the strip end 14 overlapping the strip end 16 thereat. Note that the face 25 will typically permanently adhere to the adhesive 33, or at least with sufficient aggressiveness (especially due to the preferred solid block nature of the adhesive pattern 33) so that the needs 14, 16 will not become detached during normal transportation and use of the package 40.

Note that part of the indicia that is imaged on one or both of the strips 11, 12 preferably is bar coding. Conventional bar coding indicia is illustrated at 48 in FIGS. 1 and 6, shown imaged on the face 25 although it also or alternatively may be provided on the face 17. The particular location of the bar coding 48 illustrated in FIGS. 1 and 6 is particularly desirable, however, being adjacent the header 31. When in this position it is easily found by the checker at a supermarket, and readily scanned. Note that the header 31 also provides a convenient handle for grasping by the checker to move the bar coding 48 into operative association with the scanner at the supermarket.

Figure 8:
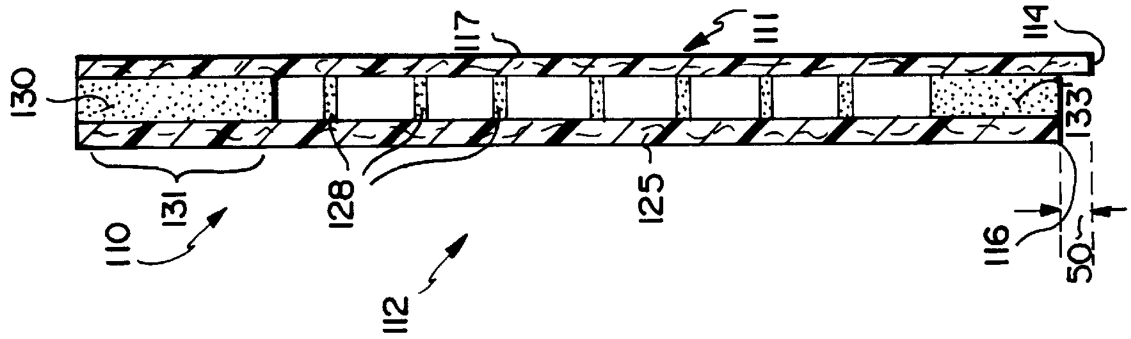
Fig. 8 (Prior Art)
FIG. 8 is a view like that of FIG. 2 for the second embodiment of FIG. 7.
Figure 7:
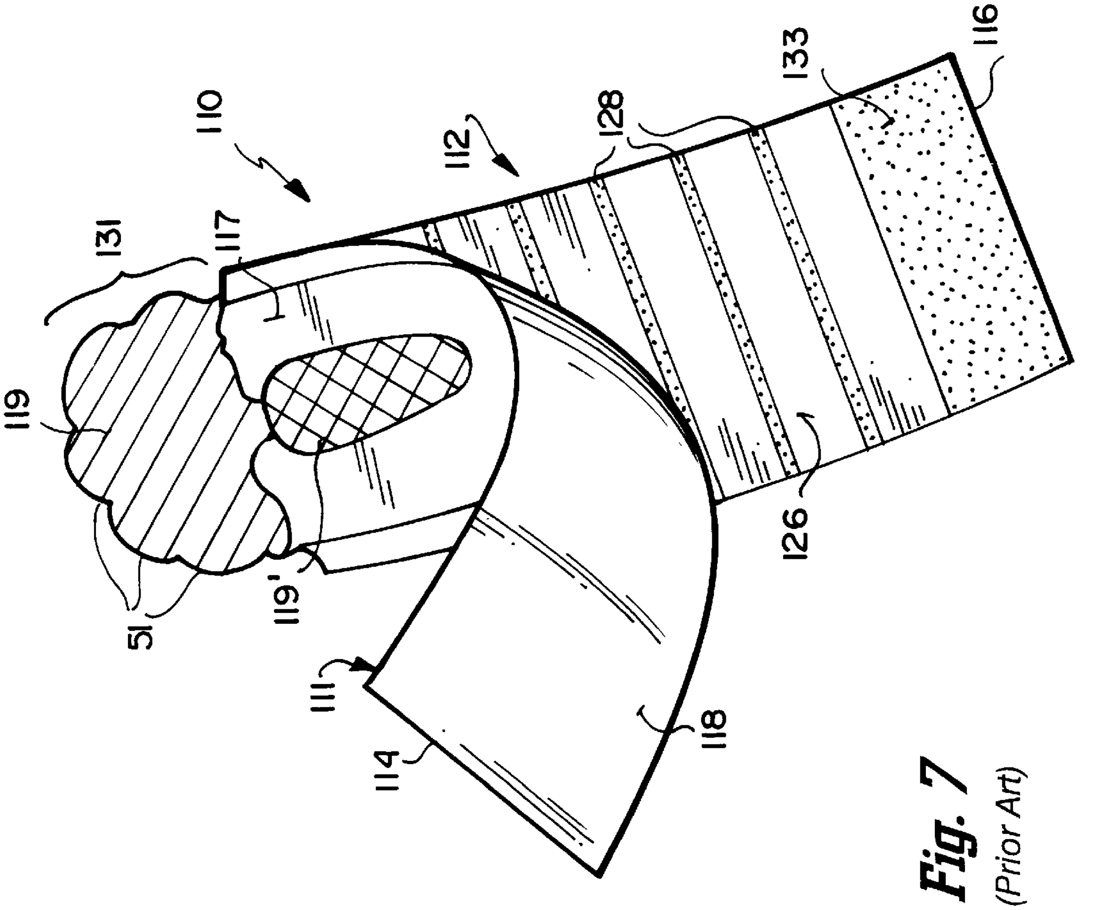
Fig. 7 (Prior Art)
FIG. 7 is a perspective view of a second embodiment of label assembly according to the prior art invention.

A modified embodiment of the label assembly according to the present invention is illustrated in FIGS. 7 and 8. In this embodiment components comparable to those in the FIGS. 1 through 6 embodiment are shown by the same reference numeral only preceded by a “1”.

The label assembly 110 includes a first strip 111 and a second strip 112, the first strip 111 being longer (but only slightly longer)—see the distance 50 in FIG. 8—than the second strip 112. The spacing 50 is merely sufficient to allow a worker who might be wearing rubber gloves to peel apart the strips 111, 112 at the second ends 114, 116 thereof to apply the label assembly 110 to a package. In this particular application it is especially desirable that the material of which the strips 111, 112 are made be a water resistant material (such as KIMDURA) since in use the strips 111, 112 likely will come into contact with ice and water.

Note that in this embodiment the adhesive pattern (e. g. block of adhesive) 133 preferably is provided on the inner face 126 of the second strip 112, and engages release material on the face 118 of the first strip 111 (as does the adhesive in the spaced strips 128 of the second adhesive pattern). Also note in this embodiment that the header 131 is provided with a configuration that is distinct from a dual right-angle configuration (such as provided for the header 31 in the FIGS. 1 through 6 embodiment). In the preferred embodiment illustrated in the drawings, the header 131 configuration—indicated generally by the reference numeral 51 in FIG. 7—simulates a perceived element of a product intended to be wrapped by the label assembly 110. For example in the particular embodiment illustrated in FIG. 7, the scallops and other surface cutouts forming the configuration 51 simulate the green tops of carrots, and the graphics 119 provided at the header 131 comprises green ink or other coloring which, in combination with the configuration 51, simulates carrot tops. Preferably on both faces 117, 125 graphics 119' are also provided which cooperate with the graphics 119, in the actual embodiment seen in FIG. 7 comprising a baby carrot simulation.

Figure 9:
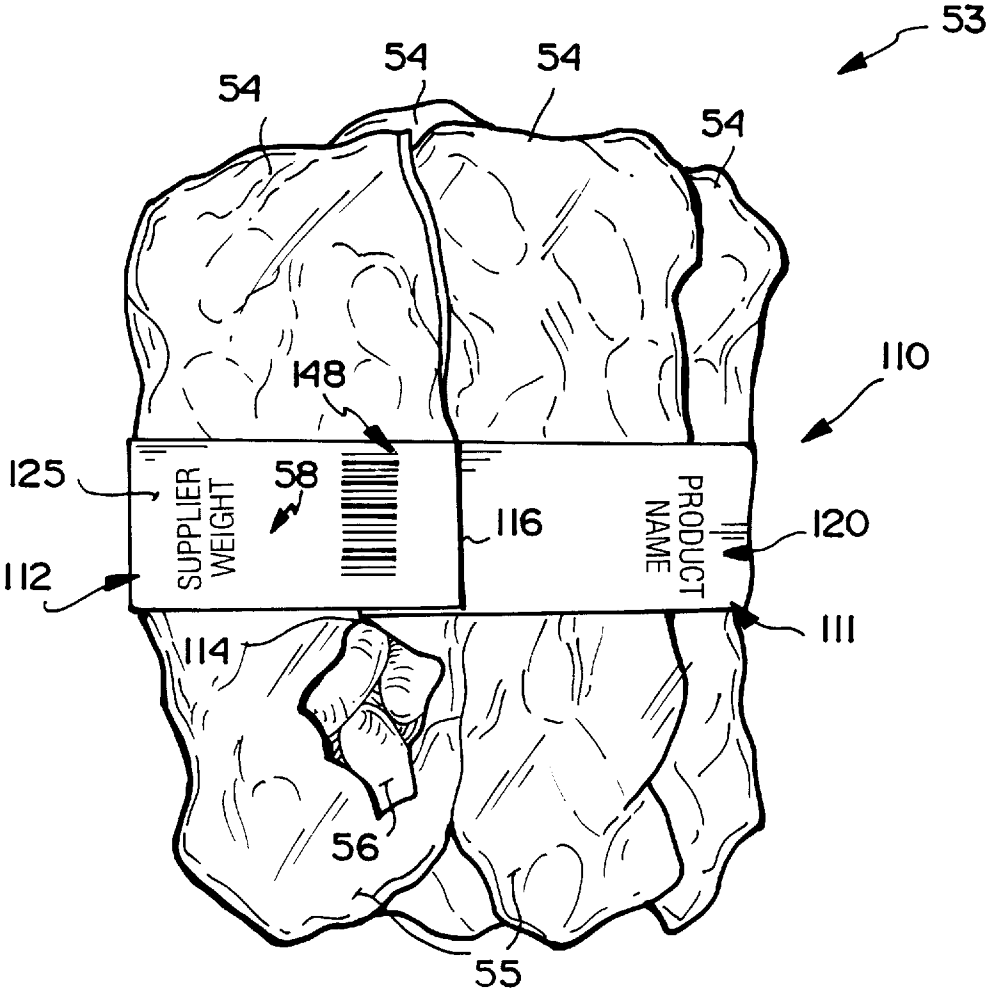
Fig. 9 (Prior Art)
FIG. 9 is a side view of an exemplary package assembly according to the present invention utilizing the label assembly of FIGS. 7 and 8.

FIG. 9 schematically illustrates a label assembly 110 shown as one of the components of a package assembly 53 according to the present invention. The package assembly 53 comprises a plurality of plastic wrapped packages, such as four packages 54 comprising low density polypropylene bags 55 containing baby carrots 56 or like products (preferably food items and more preferably vegetable food items). The label assembly 110 encircles all of the packages 54 and holds them tightly together in association with each other. This is accomplished by overlapping the ends 114, 116 of the strips 111, 112, respectively, so that the adhesive 133 comes in contact with a part of the face 117 adjacent the end 114 and is permanently affixed thereto. In this particular embodiment it is desirable to provide the bar code indicia 148 (see FIG. 9) on the face 125 adjacent the end 116 since providing it adjacent the header 131 would destroy the graphics 119' thereat. Of course any other suitable graphics or indicia (such as the product name indicia 120 and the net weight indicia 58 seen in FIG. 9) may be provided on one, either, or both of the faces 117, 125. The header 131 will be opposite that portion of the package assembly 53 illustrated in FIG. 1, and will stand out from the package assembly 53, again providing a highly visible point of purchase element, as well as allowing grasping of the package thereby.

In the embodiment of FIGS. 7 through 9 the adhesive strips 128 will engage some of the low density polyethylene plastic bags 55. However the adhesive pattern defined by the strips 128 has insufficient aggressiveness to tear significantly (that is to the point of rendering impractical or unusable as containers for the food items 56) the bags 55 when the label assembly 110 is detached from the package assembly 53. However the adhesive pattern defined by the adhesive strips 128 has sufficient aggressiveness to prevent the label assembly 110 from slipping off the bags 55. This proper blend of aggressiveness is provided by the spacing of the strips 128 (that is that they are discrete adhesive elements that are spaced from each other). Also the adhesive of the strips 128 is chosen for this purpose, but a wide variety of commercially available hot melt adhesives are entirely suitable for this purpose and the actual makeup of the adhesive forming the strips 128 (as opposed to the fact that the strips 128 are spaced) is not particularly significant, although because the label assembly 110 will probably at some time be in contact with or near ice, the adhesive should be of a conventional hot melt time that will work at temperatures around 30°–40° F.

A model of each exemplary label assembly 10, 110 generally as illustrated in FIGS. 1 and 7 is enclosed herewith and incorporated by reference herein.

It will thus be seen that according to the present invention a highly advantageous label assembly, as well as various package assemblies and display packages utilizing the label assembly, have been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and structures.

What is claimed is:

1. A point of purchase display package comprising:

a microwavable material container having a substantially closed bottom and substantially closed sides, and a top; and a display label wrapped around said container, said label comprising: first and second flexible strips of material having an outer imagable face, and first and second ends; a first permanent adhesive pattern connecting said first and second strips together adjacent said first ends thereof to form a header, said header adjacent said top of said container; indicia or graphics imaged on at least part of said outer imagable face of at least one of said strips, including said header; said second ends overlapping each other to define an overlap at a portion of said container remote from said header; and a second permanent adhesive pattern connecting said strips together at said overlap.

2. A package as recited in claim 1 wherein said container has a substantially open top, and further comprising plastic wrap covering at least said substantially open top of said container, disposed between said container and said display label.

3. A package as recited in claim 2 further comprising microwave-cookable food disposed within said container.

4. A package as recited in claim 3 further comprising a third adhesive pattern connecting said second strip to said plastic wrap or said container bottom or sides, said first strip overlying said plastic wrap covering said substantially open top of said container, and said first strip where overlying said substantially open top being devoid of adhesive connection to said plastic wrap.

5. A package as recited in claim 4 wherein the microwave-cookable food comprises one or more vegetables, and wherein said indicia or graphics includes nutritional information.

6. A package as recited in claim 2 wherein the microwave-cookable food comprises one or more vegetables, and wherein said indicia or graphics includes nutritional information.

7. A package as recited in claim 6 wherein said imaged indicia or graphics includes bar coding spaced from but adjacent said header.

8. A package as recited in claim 2 further comprising a third adhesive pattern connecting said second strip to said plastic wrap or said container bottom or sides, said first strip overlying said plastic wrap covering said substantially open top of said container, and said first strip where overlying said substantially open top being devoid of adhesive connection to said plastic wrap.

9. A package as recited in claim 8 wherein said imaged indicia or graphics includes bar coding spaced from but adjacent said header.

10. A package as recited in claim 2 further comprising a third adhesive pattern connecting said second strip to said plastic wrap or said container bottom or sides, said first strip overlying said plastic wrap covering said substantially open top of said container, and said first strip where overlying said substantially open top being devoid of adhesive connection to said plastic wrap.

11. A package as recited in claim 10 wherein said at least one microwave cookable food comprises vegetables.

12. A package as recited in claim 1 wherein said imaged indicia or graphics includes bar coding spaced from but adjacent said header.

13. A package as recited in claim 1 further comprising a third adhesive pattern connecting said second strip to said plastic wrap or said container bottom or sides, said first strip overlying said plastic wrap covering said substantially open top of said container, and said first strip where overlying said substantially open top being devoid of adhesive connection to said plastic wrap.

14. A package as recited in claim 1 wherein said display label comprises a fiber/plastic blend, or polypropylene, which material may readily withstand temperatures between about 32°–90° F. and not degrade significantly if in contact with ice or water.

15. A display package comprising:

a microwavable material container having a substantially closed bottom and substantially closed sides, and a substantially open top;

transparent plastic wrap covering at least said substantially open top of said container; and a display label wrapped around said container, said plastic wrap between said container open top and said display label; said label comprising: at least one flexible strip of material having an outer imagable face, and first and second ends; indicia or graphics imaged on at least part of said outer imagable face of said strip; said ends overlapping each other to define an overlap; a first permanent adhesive pattern connecting said ends together at said overlap; and a second adhesive pattern comprising a plurality of spaced discrete adhesive elements disposed on said inner face and engaging said container or said plastic wrap at positions remote from said substantially open top, so that adhesive does not engage said plastic wrap at said substantially open top.

16. A package as recited in claim 15 further comprising at least one microwave-cookable food disposed within said container; and wherein said graphics or indicia includes nutritional information.

17. A package as recited in claim 16 wherein the microwave cookable food comprises one or more vegetables.

18. A package as recited in claim 16 further comprising coupon or recipe indicia imaged on said strip inner face overlying said substantially open top of said container; and lines of weakness formed in said strip where overlying said substantially open top, said lines of weakness allowing ready detachment of said coupon or recipe indicia from the rest of said strip.

19. A package as recited in claim 15 further comprising coupon or recipe indicia imaged on said strip inner face overlying said substantially open top of said container; and lines of weakness formed in said strip where overlying said substantially open top, said lines of weakness allowing ready detachment of said coupon or recipe indicia from the rest of said strip.

20. A package as recited in claim 15 wherein said display label comprises a fiber/plastic blend, or polypropylene, which material may readily withstand temperatures between about 32°–90° F. and not degrade significantly if in contact with ice or water.

* * * * *